Aug. 15, 1967 R. P. SOURGENS 3,336,576

DATA TRANSMITTING SYSTEM

Filed Nov. 14, 1963

4 Sheets-Sheet 1

INVENTOR

ROGER P. SOURGENS

BY

Abraham A. Saffitz

ATTORNEY

INVENTOR
ROGER P. SOURGENS
BY Abraham A. Saffitz
ATTORNEY

Aug. 15, 1967 R. P. SOURGENS 3,336,576

DATA TRANSMITTING SYSTEM

Filed Nov. 14, 1963 4 Sheets-Sheet 3

INVENTOR

ROGER P. SOURGENS

BY

Abraham A. Saffitz

ATTORNEY

INVENTOR
ROGER P. SOURGENS
BY
Abraham A. Saffitz
ATTORNEY

United States Patent Office 3,336,576

Patented Aug. 15, 1967

3,336,576

DATA TRANSMITTING SYSTEM

Roger P. Sourgens, Bourg-la-Reine, France, assignor to Société d'Applications Générales d'Electricité et de Mécanique, Paris, France, a company of France Filed Nov. 14, 1963, Ser. No. 323,697
Claims priority, application France, Nov. 15, 1962, 915,580
4 Claims. (Cl. 340—146.1)

ABSTRACT OF THE DISCLOSURE

A system for transmitting and receiving data representative signals between a transmitting and one among a plurality of receiving stations, including means for checkback comparison of said signals at the tarnsmitting station, wherein the transmitting and receiving stations comprise central multi-stage stores and means for bringing into operation a number $n$ of stages equal to the ratio of the propagation time from the transmititng to the receiving station and back to the transmitting station by the signal duration. During transmission, the last transmitted signal and a number $(n-1)$ of preceding signals are continuously and sequentially memorized into the central stores of the transmitting and receiving stations and, in the case where an error is detected by the comparison means, only these $n$ signals are repeated.

Figure 1:
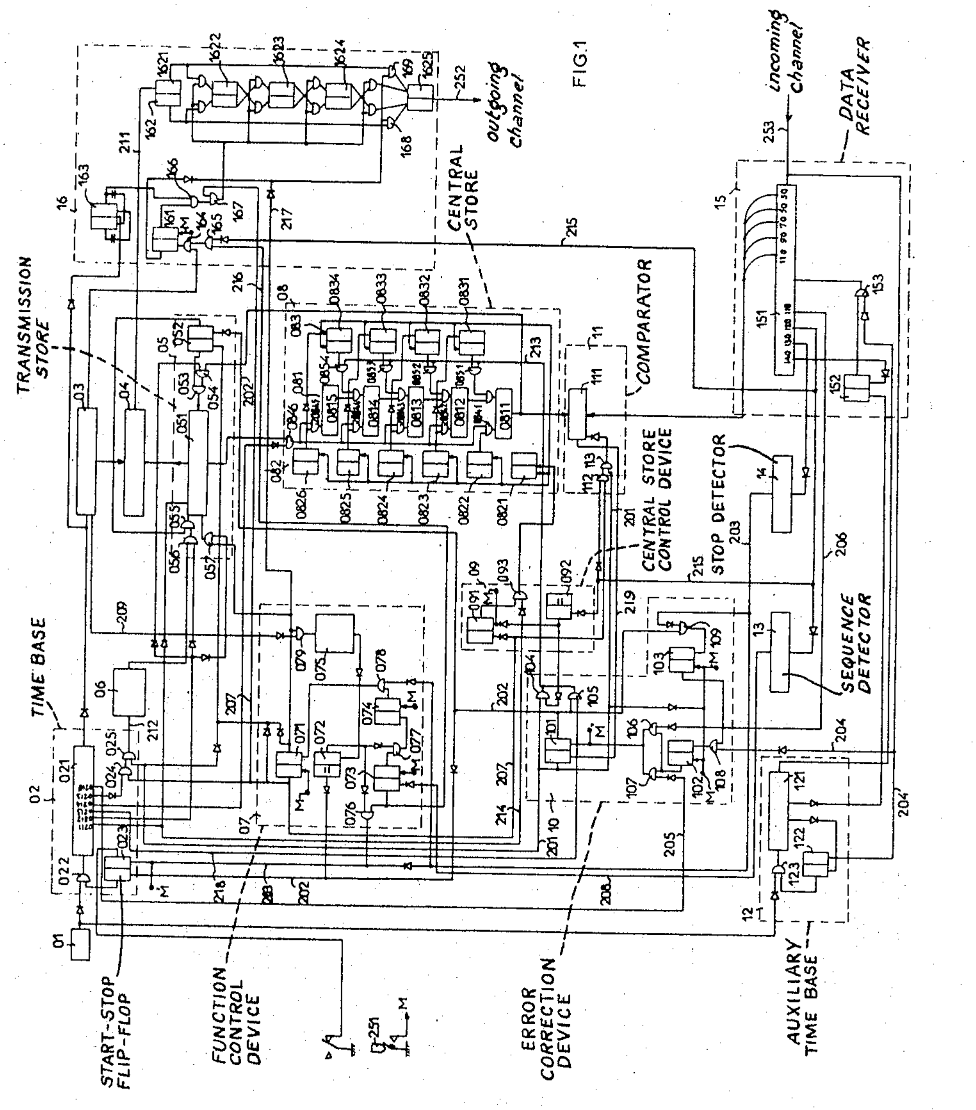

The present invention relates to a start-stop telegraphic communication system permitting the transmission of data with automatic error correction.

Start-stop telegraphic communication systems are known wherein signals read of a storage medium such as a punched tape are transmitted over an outgoing telegraph channel by a telegraph transmitter situated in a transmitting station, received by a telegraph receiver situated in a receiving station, sent back to the transmitting station through a return telegraph channel and compared with the original signals. These systems generally use a constant number of store stages, both at the transmitting end and at the receiving end, which number necessarily corresponds to the maximum transmission time there and back because it is obviously necessary for the signal in which an error is found during the comparison on return should still be stored at the transmitting station. When the transmitting station forms part of a switchable network, the transmission time to be taken into consideration is that relating to the connection having the longest transmission time. As a result, for each error found, the number of combinations repeated is invariably the maximum, even if it is a question of a local connection with a short transmission time for which a store with a smaller capacity would therefore have been sufficient. Obviously the result is a loss of efficiency, combinations which have been correctly received being uselessly repeated.

Systems of this type should be able to transmit telegraph messages from a teleprinter with a keyboard and data from a store reading device, for example from a punched tape reader, and it should be possible to effect the control of the changeover of the transmitting and receiving equipment from the telegraph transmission position to the data transmitting position through the transmission, by the transmitting device, of a characteristic combination which at present is the standard combination SSSS. It is also accepted, in the present state of the art, that it should also be possible for the reverse operation, that of changing over from the data transmitting position to the telegraph transmitting position, to be controlled from a distance by transmitting a combination selected from the data code because it is in the data transmitting position that this control takes place. Similarly, in data transmitting systems with automatic error correction, the reporting of the errors should be effected remotely from the transmitting station to the receiving station by means of a combination which can likewise only be selected from the data code. The first result of this is a reduction in the possibilities for this data code because combinations have to be subtracted therefrom solely for purposes of operation and reporting. Moreover, since data codes are very varied (each designer of a data processing machine frequently using a characteristic code), data transmitting devices using standardized combinations of the data code for the operation and reporting are out of the question because the codes are not standardized.

Finally, the necessity of ear-making certain combinations in the data code for operational and reporting instructions, as is common in the art today, prohibits preliminary ciphering (sometime desirable, however, for example for military messages) because this ciphering is liable to cause such operational and reporting combinations to appear in the texts to be transmitted and so to cause said operations and said reporting inopportunely.

Another difficulty in the data transmitting systems when it is desired to limit the number of stores to be used both at the transmitting end and at the receiving end to a minimum to allow for the transmission time there and back of each connection, lies in the precise determination of this number of stores. This obviously depends on the ratio between the total transmission time there and back and the duration of a start-stop cycle. Now this ratio may be very close to a whole number so that an ordinary variation in the numerator under the influence of the fortuitous telegraph distortion, may lead to indefiniteness of one unit in the number of stores to be used.

It is the object of the invention to provide a telegraph transmission and data transmitting system with automatic error correction in which only the minimum number of combinations imposed by the transmission time for each connection is repeated after the detection of an error.

Another object of the invention is to provide a telegraph transmission and data transmitting system with automatic error correction which only causes a number of stores equal to the whole number immediately higher than the quotient of the transmission time there and back of the signals and the duration of a start-stop cycle to intervene in the transmitting device and in the receiving device.

Another object of the invention is to provide a telegraph transmission and data transmitting system wherein the reporting of the errors does not necessitate the line transmission of a specific combination signifying an error.

A further object of the invention is to provide in systems of the type in question means for automatically adjusting the transmission time there and back of the signals in each individual connection in such a manner that there is no indefiniteness due to distortion with regard to the number of stores to be brought into action in the data transmitting and receiving devices, or in other words that the quotient of the transmission time there and back and the duration of the start-stop cycle is not close to a whole number.

According to one feature of the invention, a stop element of a longer duration than that of said element intervening at the end of a coded combination during the automatic data transmission serves as an error signal when its duration is equal to the transmission time there and back and as an instruction signal for the changeover from the data transmitting position to the telegraph transmission position when its duration is greater than a given time. It follows that nothing is borrowed from the data code either for reporting an error or for the changeover from one mode of transmission to another.

According to another feature of the invention, stores hereinafter termed central stores and comprising a plurality of stages, are associated respectively with the transmission store of the transmitting station and with the reception store of the receiving station, at the transmitting station and at the receiving station. These central stores are themselves associated with a stepping switch for access to the stages in such a manner that the information can be introduced at any desired stage and with a downward transfer control circuit enabling the information contained in stages of given rank to be transferred simultaneously to the stages of immediately lower rank.

At the transmitting station, the successive combinations representing the data are introduced, at the same time as they are transmitted, into the first stage, the second, the third etc. until the moment when the first combination returns to the transmitting station from which moment on, all the combinations are introduced into the last stage reached (designated stage) while at the same time the downward transfer control circuit is started. From then on, the combination leaving the first stage of the central store is compared with the combination currently received back and if the comparison discloses an error the transmission of fresh combinations is stopped and the combinations currently held in the central store are retransmitted.

At the receiving station, means enable it to be known how many times the start-stop cycle is contained in the duration of a stop element equal to the transmission time there and back, which enables the number of stages to be used to be known and the successive combinations representing the data are introduced at the same time as they are received into the first stage, the second, the third etc. up to the designated stage, from which moment on, all the combinations are introduced into the designated stage while at the same time the downward transfer circuit is started. From then on, the combination leaving the first stage of the central store is sent to a utilization circuit. In the event of an error indicated by a prolonged stop element, the switch is restored to the initial position and the combinations following the prolonged stop element are introduced into the stages of the central store beginning with the first stage and continuing up to the designated stage instead of the combinations which were present there.

Figure 2:
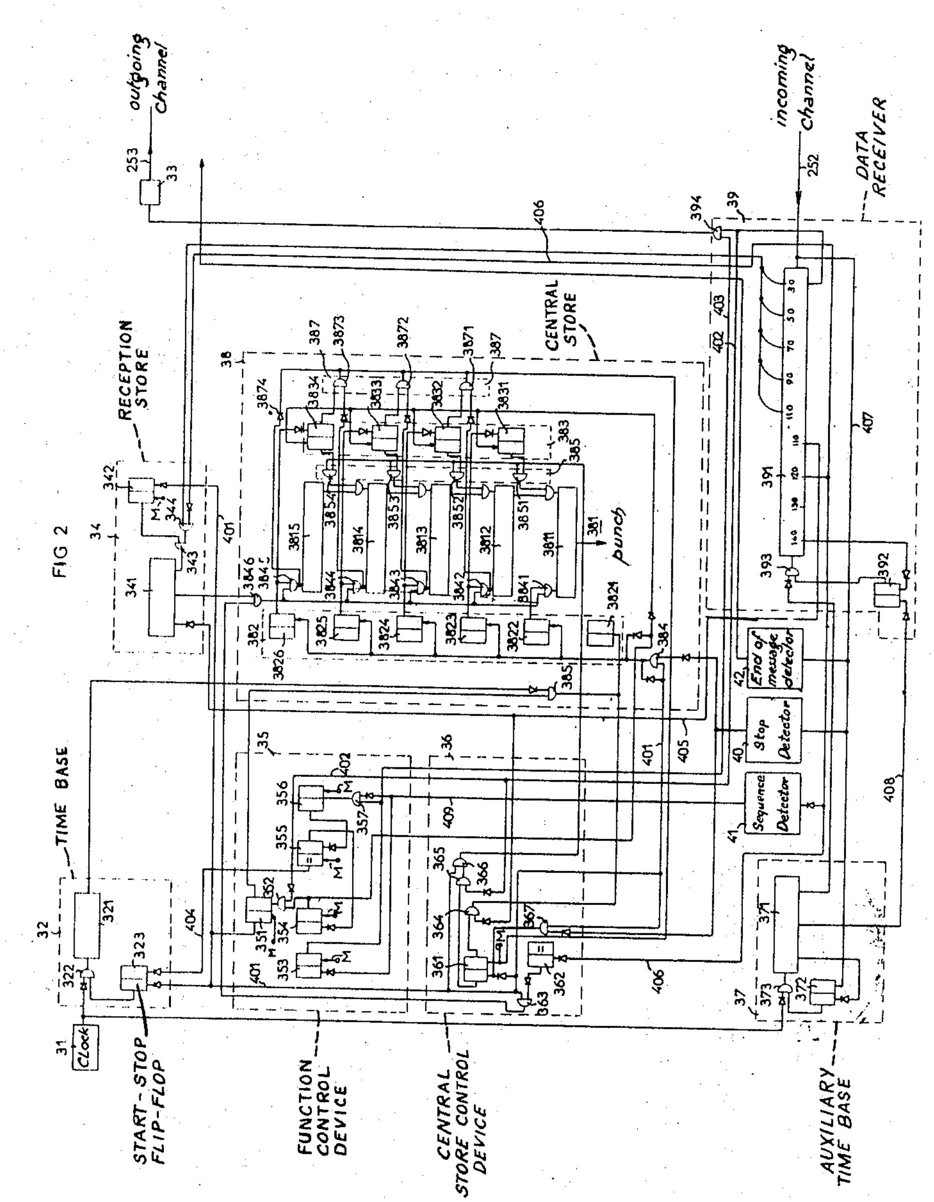
Figure 3:
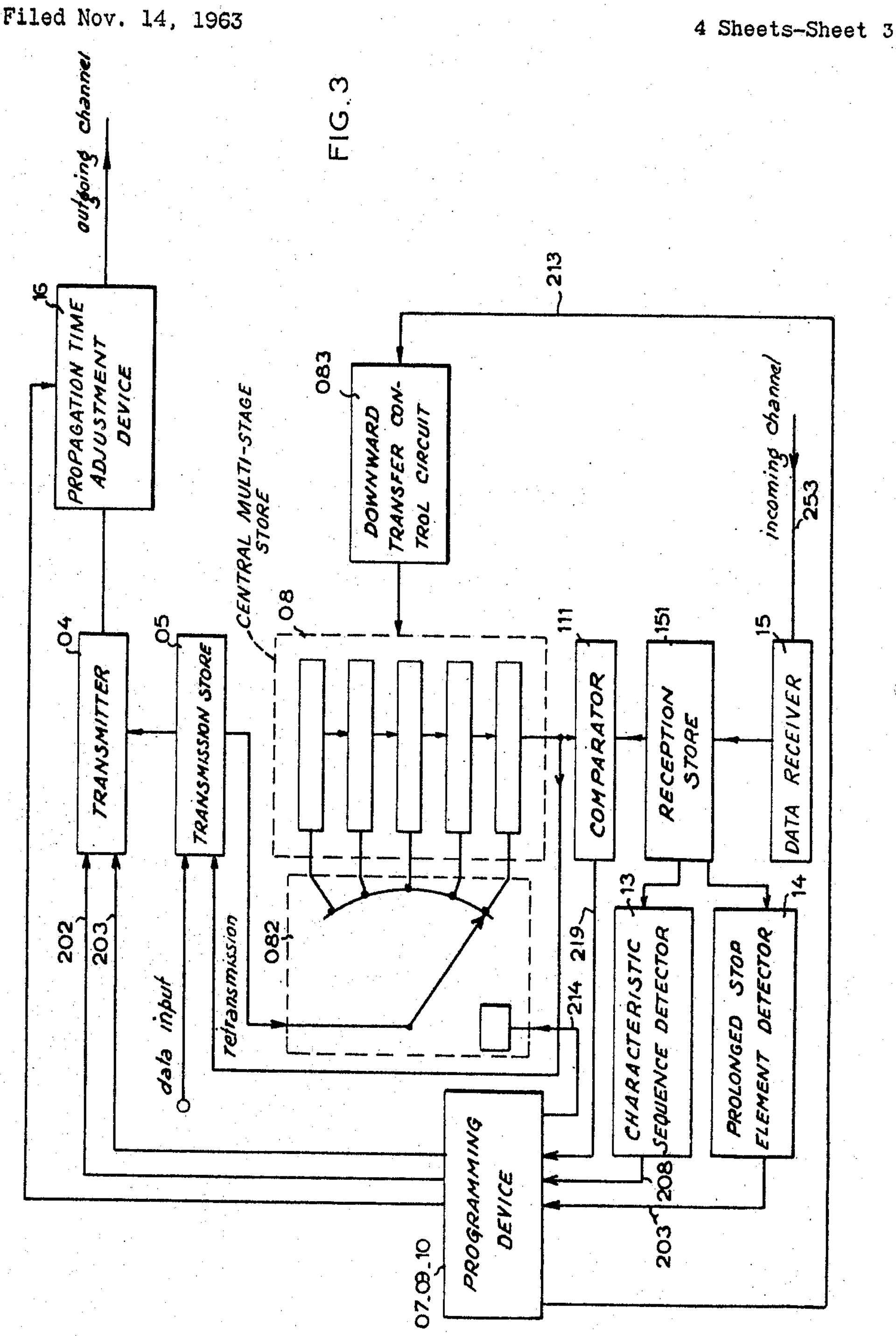
Figure 4:
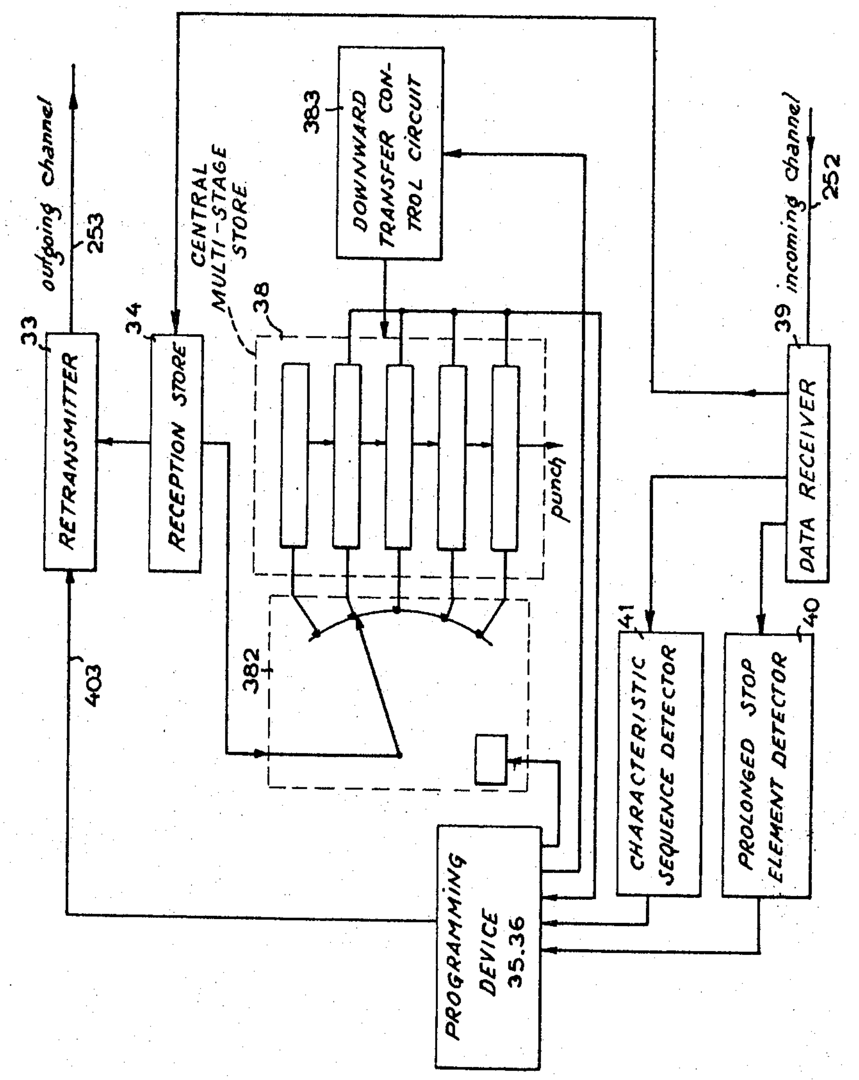

The invention will now be described in detail with reference to the accompanying drawings in which:

FIGS. 1 and 2 illustrate in detail the component members and circuits of the transmitting station and of the receiving station of the data transmitting system with automatic error correction;

And FIGS. 3 and 4 are simplified block diagrams of these same transmitting and receiving stations.

Before going into the detailed description, the general structure and operation of the system of the invention will be given briefly with reference to FIGS. 3 and 4.

The transmitting station comprises essentially a telegraph transmitter 04, a transmission store 05, a telegraph receiver 15, a reception store 151, a central store 08 for the combinations to be transmitted until the transmitted combinations and the received combinations have been compared, said store having a plurality of stages as will be explained, a comparator 111 for the transmitted signals stored in the central store and the received signals, a characteristic sequence detector 13, a prolonged stop element detector 14 and a programming device 07–09–10.

If the transmitting station is in the telegraph transmission position and wishes to change over to the data transmitting position, it transmits the particular sequence reserved for this operation (sequence SSSS in the present procedure) several times to the receiving station and counts the number of times. The first sequence serves to bring the receiving station into the data transmitting position. The subsequent sequences are transmitted back by the receiving station to the transmitting station and detected by the detector 13. On receiving a signal from 13, the programming device 07–09–10 stops the telegraph transmitter 04 through the wire 202 and the result is a prolonged stop element. When this prolonged stop element returns to the transmitting station it is detected by the detector 14. On receiving a signal from 14, the programming device 07–09–10 brings the transmitting station into the data transmitting position (in order to facilitate understanding of the detailed description, it should be noted that the data transmitting position of the transmitting device is characterized by the setting in operation of a flip-flop 071 in the programming device 07–09–10).

It is important to note that the prolonged stop element is stopped when its leading edge has returned to the transmitting station; the duration of the stop element is therefore a function of the transmission time there and back.

The combinations representing the data are then transmitted by the telegraph transmitter 04 and simultaneously introduced, by which the switch 082, into the first stage of the central store 08, then into the second stage and so on, as a result of a switch 082 controlled by the wire 214, advancing by one step for each combination transmitted until the return of the first combination representing data. This combination is received by the telegraph receiver 15 and recorded in the reception store 151. The combination written in the first stage of the central store and in the reception store is then compared. If the comparison does not disclose any error, the switch 082 is stopped and then marks a certain stage in the central store 08. It is at this stage, termed the designated stage, that all the combinations transmitted will henceforward be introduced and each fresh introduction of a combination into this stage is preceded by a downward transfer, that is to say each combination written into a store stage of a certain rank is transferred to the stage of immediately lower rank while the combination written in the first stage is erased. The downward transfer is controlled by the circuit 083, itself controlled by the programming device through the wire 213. And the process continues; each combination transmitted is introduced into the stage of the central store 08 which has been marked by the switch 082; each combination received is compared in the comparator 111 with the combination contained in the first stage; this latter is erased and all the combinations written in the central store move down one stage.

If an error is detected in the course of the comparison made by the comparator a signal is transmitted by 111 to the programming device 07–09–10 through the wire 219 (in order to facilitate understanding of the detailed description, it should be noted that the presence of an error is characterized by the setting in operation of the programming device). The programming device stops the transmission of the combinations through the wire 202 which produces a prolonged stop element on the line which constitutes an indication of an error. This prolonged stop element returns to the transmitting station where it is detected by the detector 14. A signal is transmitted by 14 to the programming device which initiates the re-transmission. The telegraph transmitter 04, which was stopped, is started again through the wire 203. The combinations contained in the stages of the central store 08 move down one stage at each cycle and that which is contained in the first stage is transferred to the transmission store 05 and transmitted by the telegraph transmitter 04. At the same time as it is transmitted, it is likewise transferred to the designated stage. And the process continues until the return of the first retransmitted combination when there is a return to normal data transmission.

The receiving station comprises essentially a telegraph retransmitter 33, a telegraph receiver 39, a reception store 34, a central store 38 for the combinations received until they have been compared by the transmitting station, said store having a plurality of stages, a characteristic sequence detector 41, a prolonged-stop element detector 40 and a programming device 35–36.

The first characteristic sequence received by the receiver 39 is detected by the detector 41. This detector transmits a signal to the programmer 35–36 which starts the retransmitter 33 through the wire 403. The first sequence is therefore not sent back to the transmitting station and serves only to cause the receiving station to change over into the data transmitting position. The following characteristic sequences are retransmitted to the transmitting station and it has been seen that these cause the latter to change over into the data transmitting position which resulted in the transmission of a prolonged stop element. This stop element, as already explained, has a duration which is function of the propagation and it serves to determine the number of stages of the central store 38 which have to be brought into service.

The central store 38, like the central store 08, is associated with a switch 382 which determines the stage of the central store into which are transferred the combinations contained in the reception store 34 and with a downward transfer control circuit 383.

The stepping on of the switch 382 is controlled by the programmer 35–36 at the rate of one switch step per cycle throughout the whole duration of the prolonged stop element. Said switch stops at a certain stage of the central store 08 which is the designated stage. Then it is returned to the initial position.

Each combination received by the telegraph receiver 39 is on the one hand retransmitted by the retransmitter 33 and on the other hand transferred to the reception store 34 and from there into the first stage of the store 38 for the first combination, into the second stage of the store for the second combination and so on up to the designated stage. When the designated stage has been filled, a pulse is transmitted from this stage to the programmer 35–36. The programmer then stops the step-by-step advance of the switch 382. All the following combinations are transferred into the designated stage and before each introduction of a fresh combination, the downward transfer control circuit is actuated. All the combinations move down one stage and that which was contained in the first stage is passed to a utilization circuit, for example a punch.

When a prolonged stop element indicating an error is detected by the detector 40, a signal is transmitted by this detector to the programmer 35–36. The programmer blocks the downward transfer control circuit 383 and restores the switch 382 to the initial position. The combinations which follow the prolonged stop element are therefore introduced in succession into the stages of the central store from the first stage to the designated stage instead of those which were there before the prolonged stop element.

The transmitting device consists of sixteen units numbered 01 to 16 in FIG. 1. These units are the following:

(1) A clock 01 consisting of a pilot oscillator equipped with a shaping circuit for obtaining square-wave signals.

(2) A primary transmission time base 02 controlled by said clock and comprising:

(a) A time base proper 021 which produces, each cycle, a group of control pulses appearing at the output terminals numbered 0211 to 0216. These pulses are very short, appear at the beginning of the start element in each transmission cycle and are spaced at extremely short intervals of time;

(b) A gate 022 which does or does not permit the passage of the square-wave signals from the clock 01 to the primary time base 021 according to whether it is opened or not by the flip-flop 023;

(c) The flip-flop 023, called the "start-stop" flip-flop, which releases the time base 02 according to its state;

(d) The staggered gates 024 and 025 which permit the feed of the stepping device of a tape reader 06 with the pulse leaving the terminal 0215 of the time base 021 subject to a double condition which will be explained later.

(3) A telegraph time base 03 controlled by the primary time base 02.

(4) A telegraph transmission matrix 04 fed by the telegraph time base 03.

(5) A transmission store 05, transmitting to the time-staggering matrix 04 the code elements of the characters to be transmitted and composed of:

(a) A transmission store proper 051, with five cells;

(b) A transmission-retransmission flip-flop 052 which, according to its state, permits the filling of the store 051 either normally by the transmission members 06 through the gates 056 and 055 or, following the finding of an error, by the retransmission members 08 through the gates 054 and 053;

(c) The staggered gates 053 and 054 which, in the retransmission position, control the filling of the store 051 by a pulse leaving the terminal 0212 of the primary time base 021;

(d) The staggered gates 055 and 056 which, in the transmission position, control the filling of the store 051 by the same pulse leaving the terminal 0212 of 021;

(e) The gate 057 permitting the filling of the store 051 from a characteristic sequence transmission circuit by the pulse leaving the terminal 0212 of 021.

(6) A tape reading device 06 composed of a tape reader proper and its control circuits. The pulse leaving the terminal 0215 of 021 causes the advance of the reader when the gates 024 and 025 are open simultaneously.

(7) A function control device 07 consisting of:

(a) A flip-flop 071 which, in the One state (conducting on the right) controls the member necessary for the function "change to data transmission" and, in the Zero state (conducting on the left) controls the members provided for the function "data transmission";

(b) A monostable multivibrator 072 adapted for the successive control first of the "start-stop" flip-flop 023, then of the starting of the assembly for data transmission;

(c) A flip-flop 073 which directs the pulse generated by the monostable multivibrator 072 coming to rest, either to the "start-stop" flip-flop 023 by means of the gate 076 and the wire 023, or to circuits for actually starting the data transmission by means of the gate 077;

(d) A flip-flop 074 which, under the control of the monostable multivibrator 072 and the flip-flop 073 controls the opening of the gate 078 and so prepares the return of the flip-flop 071 to the Zero position (data transmission);

(e) A counter 075 which counts the four consecutive characters of the signal for changing over to data transmission and moves on one step on each pulse produced by the telegraph time base 03 through the wire 209 and the gate 079 opened by the flip-flop 071 in the One position (function "change over to data transmission").

(8) A central multi-stage store 08 consisting of:

(a) A store input assembly 081 comprising five store stages numbered 0811 to 0815 supplied as indicated below;

(b) A switch 082 the purpose of which is to control the opening of the gates 0841 to 0845 which control the access to the store stages 0811 to 0815;

(c) A distributor 083 each element of which is positioned by the corresponding elements of the switch 082 and the purpose of which is to open the gates 0851 to 0854 adapted to control pulses originating from a control device 09 described below, with the object of transferring, on request, the information contained in each of the stages 0812 to 0815 to the stage immediately lower and possibly of transferring (in the retransmission position following the detection of an error) the information from 0811 to the transmission store 051;

(d) The general gate 0846 which controls the transfer of the information included in 051 to the store 08 and more specifically into that one of the stages 0811 to 0815 of which the access gate 0841 to 0845 is open. The moment of this transfer is determined by the pulse produced at the terminal 0214 of the time base 021.

(9) A control device 09 for the central store composed of:

(a) The flip-flop 091 controlling the gate 093. In the One position it opens this gate to permit passage of the pulses leaving the terminal 0211 of 021 and arriving by the wire 214 and so controls the stepping of the switch 082. It is itself brought into the One position by the changeover into the Zero position (data transmission) of the flip-flop 071. It is restored to the Zero position by a monostable multivibrator 092 when this comes into the stable Zero position;

(b) The monostable multivibrator 092 receives a pulse at the end of each receiving cycle (here leaving the terminal 120 ms. of the circuit 151 and transmitted by the wire 215) which brings it into the unstable One position. On returning to the stable Zero position it causes the flip-flop 091 to return to the Zero position. It will be understood that the stepping of the switch 082 is thus stopped from the end of the first character received over the receiving channel. From this moment, the informations which follow at 051 are automatically transferred to the same stage of the store 081. This is the designated stage.

(10) A device 10 for instructions following the detection of errors consisting of:

(a) The error-reporting flip-flop 101, the position of which varies according to the "error" or "no-error" state of the device. In this latter case, the flip-flop 101 is in the Zero position and delivers a signal along the wire 201. It then opens the gate 025 and permits the stepping on of the tape reader 06 so far as it is concerned. It likewise permits, through the opening of the gate 113, the control of a modulation comparator 111, the purpose of which will be seen later. It further permits, through the opening of the gate 104, the downward transfer control of the central store 081 by the monostable multivibrator 092. Coming into the Zero position, it applies a pulse to the flip-flops 102 and 103 mentioned below and restores them to the normal One position.

In the "error" position, the flip-flop 101 is in the one position and delivers a signal over the wire 202. It then prohibits the preceding functions. On the other hand, by opening the gate 105, it permits the downward transfer control of the store 81 by the pulse leaving the terminal 0213 of the primary time base 021. It prepares its own return circuit by opening the gate 109 by a process explained below and bringing into operation, apart from said gate 109, the flip-flop 103, the gate 108, the flip-flop 102 and the gate 107. Moreover, on coming into the One position, it stops the transmission by bringing the "start-stop" flip-flop 023 into the One position; it brings the flip-flop 052 into the Zero position, which has the effect of opening the gate 053 and so permitting the retransmission to the transmission store 051 of the information arriving in succession at the stage 0811 of the store 081.

The flip-flops 102 and 103 are flip-flops which, in the event of an error, prepare the reset of 101 by means of gates 106, 107, 108 and 109 when there occur simultaneously:

The detection of a prolonged stop element by the detection circuit 14 through the wire 203 and the gate 109 as will be seen later;

The detection of a start element coming immediately after a prolonged stop element indicating an error through the wire 204 and the gate 108.

This reset of the flip-flop 101 is effected by whichever of the following two pulses appears first:

Pulse leaving the terminal 0216 of the primary time base 021, through the wire 205 and the gate 107;

Pulse applied by the reception store 151 at the moment 110 ms. for example in each reception cycle, through the wire 206.

(11) A modulation comparator 11.

This device permits the comparison, element by element, of each combination included in the reception store 151 and the corresponding combination contained at the same moment in the cell 0811 of the central store 081. This comparison is effected, after the reception of each combination, for example at the moment 120 ms. in each cycle, as a result of a pulse applied to the comparator 111, through the gates 112 and 113 controlled respectively by the flip-flops 071 (wire 207) and 101 (wire 201) and rendered conducting when 071 is in the Zero position (position "data transmission") and 101 in the Zero position ("no error" position). When the comparator finds a disagreement between the combinations disclosed by 0811 on the one hand and 151 on the other hand, it transmits over the wire 219 a pulse which causes 101 to change over into the One position ("error" position).

(12) A primary reception or auxiliary time base 12 consisting of an actual time base arrangement 121, fed by the clock 01 through the gate 123 itself controlled by a flip-flop 122.

This time base 121 controls the positioning of the code elements of the return modulation in the reception store 151. It is fed with clock pulses when the flip-flop 122 is brought into the Zero position through the wire 204 by the start element in each receiving cycle. This flip-flop is restored to the normal One position towards the end of each receiving cycle by a pulse leaving the primary reception time base 121.

(13) The detector 13 for the sequence denoting the change-over to the data transmitting position. This detector is a counter which, after having detected the appropriate character four times in succession, delivers a pulse over the wire 208, at the end of the fourth receiving cycle, to the flip-flop 073 of the function control device 07 and brings it into the One position.

(14) The prolonged stop element detector 14. This detector has the effect of detecting a prolonged stop element of a duration greater than a predetermined value, 130 milliseconds in the example selected, said prolonged element characterizing either the end of the function "change over to data transmission" or the detection of an error in operation. A pulse originating from 151 arrives at detector 14. This latter, in turn, transmits an instruction pulse over the wire 203 to:

The "start-stop" flip-flop 023 which, coming into the Zero position, opens the gate 022 and re-starts the transmission time base;

The flip-flop 071 (through the gate 078) which assumes the Zero position corresponding to the "data transmitting" position or is retained there in the event of the device being in the "error" position;

The gate 109, opened by 101 in the event of an error; the pulse then causes 103 to change over into the Zero position which opens the gate 108; with the leading edge of the start element which follows the prolonged stop element, the pulse through 108 brings the flip-flop 102 into the Zero position which opens the gates 106 and 107 and prepares for the return to the normal position (no error) by the changing over of 101, either through the pulse emitted from the terminal 0216 of 021 or through the pulse emitted from the terminal 110 ms. of 151, as stated previously.

(15) A receiving unit or data receiver 15 comprising a store 151 where the signals received are recorded, being shifted in time under the control of the primary reception time base 121 through the gate 153 controlled by the flip-flop 152. This latter permits the storing in the store 151 of the signals received, by means of a pulse emitted from the terminal 10 ms., of 121 (which brings it into the One position) at the beginning of each combination, said pulse being produced only if the reception time base 12 recognizes the fact that this beginning of a combination is not a false start element. This flip-flop 152 is automatically reset towards the end of each receiving cycle by a signal taken from the terminal 140 ms.

(16) The time adjustment device 16. This device comprises:

A delay line 162 consisting here, by way of non-limiting example, of a shift store 1622–1624 which, on request, transfers the state of the modulation flip-flop 1621 (connected to the matrix 04) to a transmission flip-flop 1625;

A multivibrator 163 delivering stepping pulses to the shift store 1622–1624 through the gates 166 and 167 connected in series. This multivibrator is synchronized by the time base 021 when this is working. The rest of the time it operates freely;

A control flip-flop 161. In its One position, this flip-flop controls the gate 166 and opens the way, so far as it is concerned, for the stepping pulses leaving 163. In the Zero position, these transfer pulses are blocked, the gates 168 and 169 are open and the modulation of 1621 is applied directly (without delay therefore) to the output flip-flop 1625. The gate 167 is controlled by the flip-flop 071 through the wire 207 in such a way that it is only open when this is in the Zero position, that is to say in the data transmitting position. The flip-flop 161 is brought into the One position (automatic introduction of the delay line) from the beginning of each message, during the function of changing over into the data position through a double condition introduced by the gates 164 and 165. The gate 164 is only open during a certain interval of time in the transmission cycle (from the moment 140 ms. in one cycle to the moment 20 ms. in the following cycle in the example selected). As a function of the changeover into the data position (characterized by the flip-flop 073 in the Zero position) the gate 165 receives a signal through the wire 216 and a pulse through the wire 215 corresponding to a given moment in the receiving cycle (moment 120 ms. in the example selected). In the case described, therefore, the delay line is only introduced automatically when the moment 120 ms. in the receiving cycle comes after the sending of the characteristic sequence, in the interval 140 ms. to 20 ms. in the transmission cycle. This coincidence (in the example selected) may appear for certain critical propagation values, for which values the variations due to the normal effect of distortion are liable to introduce indefiniteness into the evaluation of the number of stores to be brought into action.

The presence of the multivibrator 163 is necessitated by the fact that, during the blocking of the time base by 023, it is necessary to empty the delay line of the last modulation elements which it may contain. Obviously said time base, which is blocked, cannot be used to obtain this result.

The control flip-flop 161 is brought into the One position at the moment of the function for the change over into the data position at the beginning of each working session. It is restored to the normal Zero position first of all when the device is switched over to data transmission.

The receiving device consists of eleven units numbered 31 to 41 in FIG. 2 and listed below:

(1) A clock 31 consisting of a pilot oscillator equipped with its pulse-shaping circuits; this clock is identical to the clock 01;

(2) A time base 32 which comprises the actual time base 321 which produces pulses adapted, as will be seen later, to position a switch 382, the transfer of these pulses being permitted or not by a gate 385. The operation of the time base 321 is released or blocked by a gate 322 under the control of a flip-flop 323;

(3) A retransmitter 33 which, under the control of a gate 394 referred to below, transfers to the transmission line 253 (return) with a delay of ten milliseconds, the modulation received over the incoming receiving channel 252 and previously regenerated;

(4) A reception store 34 consisting of an actual store 341 filled at the end of each receiving cycle through a double set of gates 343–344. There are five gates 343 and five gates 344. The gates 343 are under the control of the flip-flop 342 which is brought into the Zero position at the moment when the assembly changes over into the data transmitting position, by the flip-flop 351 through the wire 401. The gates 344 are under the control of the polarity of the code elements received. The transfer from the store 391, which will be referred to later, to the store 341 is controlled by a pulse taken from the output 120 ms. of said store 391.

The information contained in the store 341 will later be transferred, as will be seen below, to a multi-stage serial store 38.

(5) A function control device 35 comprising:

A flip-flop 351. By assuming the Zero position, this flip-flop, through the wire 401, causes the "start-stop" flip-flop 323 to be brought into the One position, which blocks the gate 322 and consequently the time base 321. At the same moment, it brings the marking flip-flop 342 into the Zero position (thus opening the access to the store 341) and restores the stepping switch 382 to the initial position. It brings the flip-flop 361 into the One position which opens the gate 364. Finally, it opens simultaneously the gates 363 (which controls the transfer of the information contained in the store 341 to the central multi-stage store 381), 366 (which controls the downward transfer in said central store 381), 367 (which prepares its own return), 384 (which controls the return to Zero of the stepping switch 382 by a prolonged stop element detector 40 described below). This flip-flop 351 is brought into the Zero position by a pulse emitted from the terminal 10 ms. of the reception store 391, which is applied thereto through the wire 402 and the gate 352;

A flip-flop 353 which, controlled by a characteristic sequence detector 41 through wire 409, assumes the One position from the end of the first characteristic sequence received. In this position, through the wire 403, the flip-flop 353 opens the gate 394, which enables the modulation received to be returned, from this moment on, to the return channel 253, served by the transmission device 33. On the other hand, 353 likewise opens the gate 357 so that, on each subsequent characteristic sequence, a counting pulse from 41 passes through it;

A flip-flop 356, connected as a divider and actuated by said counting pulses. In the normal state in the Zero position, this flip-flop comes into the One position after the following characteristic sequence detected by 41 (the second transmitted by the correspondent). Following a fresh characteristic sequence detected by 41 (the third), the flip-flop 356 returns to the Zero position;

A monostable multivibrator 355 which receives the control pulse generated at this moment by the left-hand member of the flip-flop 356. The flip-flop 355 first assumes the Zero position (unstable) then, at the end of a very short time returns to the stable One position. During the first period, 355 transmits a pulse to the flip-flop 323 (wire 404) and brings it into the Zero position (resulting in the opening of the gate 322 and, consequently, the release of the time base 321). During the second period, a pulse is transmitted to the flip-flop 354 mentioned below;

A flip-flop 354. In the Zero position, at rest, this flip-flop blocks the gate 352. When it has received the pulse originating from 355, that is to say shortly after the reception of the third characteristic sequence transmitted by the correspondent (the last before the appearance of the actual data) the flip-flop 354 opens the gate circuit 352. It follows that, ten milliseconds after the front of the first outgoing element of the data modulation, the pulse leaving the terminal 10 ms. of 391 brings the flip-flop 351 into the Zero position. At this moment, the flip-flop 323 receives from 351 a pulse which causes it to change over into the One position. The gate 322 is closed, the pulses transmitted by the time base 32 to the switch 382 through the gate 385 are no longer produced. Moreover, this gate 385 is itself blocked by 351.

(6) A control device 36 for the central store comprising;

A flip-flop 361 which, in the One position, opens the gate 364 and, in the Zero position, the gate 365. The opening of the gate 364 permits the stepping on of the stepping switch 382, following pulses (output 110 ms. of 391) located in the last portion of each reception cycle. The connections between the flip-flops 3821 to 3826 of the switch 382 are not illustrated in FIG. 2. The opening of the gate 365 enables the downward progression system of the central store 381 to be fed with pulses leaving the terminal 10 ms. of 391 (consequently on each start element of the incoming modulation) and transmitted by the wire 402. This feed can only take place, however, during the actual data transmission, that is to say when the gate 366 in series with the gate 365 is rendered conducting through the flip-flop 351 which has then come into the Zero position.

The flip-flop 361 is initially in the Zero position. It comes into the One position at the moment when the flip flop 351 comes into the Zero position and, since said flip-flop 351 is in this Zero position when a prolonged stop element detected by the detector 40 (as will be seen below) causes a pulse which passes through the gate 367;

A monostable multivibrator 362. Brought into the unstable One position by a pulse leaving the terminal 120 ms. of 391 which is applied to it through the wire 406, it applies, on its return to the stable Zero position, a pulse to the gate 363 (opened by the flip-flop 351), then to the gate 3846. The information contained in 341 is then transferred to the stage of 381 previously rendered accessible through the action of the stepping switch 382 and of the gates 3841 to 3845 as will be seen below.

(7) A primary reception or auxiliary time base 37 comprising mainly a conventional time base 371 associated with a gate 373 and a flip-flop 372. The flip-flop 372 is brought into the Zero position as soon as the leading edge of the starting element of each combination received is transmitted by the wire 407. In this Zero position, the gate 373 is open and the time base 371 is fed with control pulses by the clock 31. Towards the end of the cycle, this flip-flop 372 is restored by the primary reception time base 371.

This primary time base 371, on the other hand, through the wire 408, brings the flip-flop 392 into the One position in which the gate 393 is open (as will be seen later). Thus it allows sampling pulses for the modulation received to pass through the gate 393.

(8) A central store 38 composed of:

A storage unit 381 similar to 081 comprising five stages of stores 3811 to 3815 connected as indicated below:

A stepping switch 382 similar to 082, the purpose of which is to distribute the information contained in the store 341 between the stages 3811 to 3815 by means of gates 3841 to 3845 which are opened in succession; this switch is controlled by the control device 36 already described;

A switch 383 each member 3831–3834 of which is brought into the Zero position by the corresponding members of the switch 382 and the purpose of which is to open the gates 3851 to 3854 to the pulses originating from the control device 36 with a view to a downward transfer. In these circumstances, the information contained in each of the stages 3812 to 3815 is transferred to the stage immediately lower while the information of 3811 is transferred to an output punch or any other recording device;

A general gate 3846 which permits the transfer of the information contained in 341 to the gates 3841 to 3845 and the store stages 3811 to 3815 served thereby.

(9) A reception unit or data receiver 39 consisting mainly of the store 391 associated with the flip-flop 392 and with the gates 393 and 394. The flip-flop 392 is brought into the One position by the time base 371 and opens the gate 393 to the pulses originating from the time base 371 and adapted to sample the information received from the channel 252 into the reception store 391. At the end of the cycle, when this sampling has been carried out, it is restored by a pulse leaving the terminal 140 ms. of 391. The gate 394, as stated above, ensures the retransmission, over the return channel 253 of the modulation received over the incoming channel 252.

(10) The purpose of the prolonged stop element detector 40 is to detect the prolongation of any stop element which is known to constitute an error indication. The effect of this detection is to apply, on the one hand, a pulse to the gate 384 which is open and so to cause the return of the stepping switch 382 to the initial position. A pulse is likewise applied by 40 to the gate 367 which is likewise open, as a result of which 361 is changed over into the One position thus opening the gate 364. The pulses leaving the terminal 110 ms. of 391 thus ensure the stepping on of the stepping switch 382.

(11) A characteristic sequence detector 41. This is a counting device which, after having detected four consecutive combinations delivers, towards the end of the receiving cycle of the last combination, a pulse to the gate 357 on the one hand and to the flip-flop 353 on the other hand, as seen previously when the function device 35 was described.

(12) An end of message detecting device 42. This device detects the signals of the same polarity as the stop element and of a duration greater than a given value, in the example selected 1.5 seconds, in order to differentiate them clearly from the maximum prolonged stop signal indicating an error.

The operation of the device forming the subject of the present invention is as follows:

At the transmitting station, pressing the "Start" button 251 causes grounding of all the points marked M which prepares the various circuits for the sending of the sequence for changing over to data transmission over the outgoing channel 252 and its reception over the return channel 253, the central store 08 being disconnected. It is only after the reception over the return channel 253 of said sequence sent back by the receiving station that the actual data transmission starts automatically.

This pressing of the "Start" button causes, in the unit 07:

(1) The changing over of 071 to the One position which position is characteristic of the function "transmission of characteristic sequence."

The flip-flop 071 then permits:

(a) The counting of the combinations in the characteristic sequence by opening the gate 079 which allows the control pulses for the counter 075 to pass through, which pulses are produced at the moments 120 ms. in each transmission cycle by the telegraph time base 03 and transmitted over the wire 209;

(b) The introduction of the characteristic combination into the transmission store 051, which introduction is controlled by the pulse taken from the terminal 0212 of the transmission time base 021;

(c) The transfer by the matrix 04 of each element of the characteristic combination from the transmission store 051 to the flip-flop 1621 over the wire 211 and directly to the output flip-flop 1625 of the unit 16.

The flip-flop 071 then prohibits;

(a) The advance of the tape reader 06 by the time base 02 through the wire 212 by closing the gate 024 through which this advance is controlled; this prohibition of advance is effected through the wire 207;

(b) The control of the comparator 111 through the wire 207 by closing the gate 112;

(c) The control of the output shift store 162 by closing the gate 167, likewise through the wire 207.

(2) The changing over of 073 into the Zero position opening the gate 076 so that the pulse produced by the monostable multivibrator 072 returning to the normal position is then directed over the wire 203 to the "start-stop" flip-flop 023 and so causes the release of the transmission time base 021 by opening the gate 022.

(3) The changing over of 074 into the Zero position which closes the gate 078 controlling the flip-flop 071.

At the same time, the pressing of the "start" button causes:

In the unit 08, the restoring of the switches 082 and 083 to the initial position;

In the unit 09, the changing over of 091 which, in the Zero position prohibits the control of the stepping on of the switch 082 by closing the gate 093;

In the unit 10, the changing over of the flip-flop 101 to the Zero position which leads to the control of the comparator 111 by opening the gate 113, the advance of the tape reading device 06 by opening the gate 025 and the downward transfer of the central store 081 by opening the gate 104.

The changing over of 102 and 103 into the One position also prepares the circuits for restoring 101 to the Zero position after the detection of each error.

With regard to the unit 16, pressure on the "start" button brings the flip-flop 161 into the Zero position which maintains the opening of the gates 168 and 169 already opened by the flip-flop 071 of the unit 07 and prevents the advance of 162 by closing the gate 166.

Finally, in the unit 02, the pressing of the "start" button 251 brings the flips-flop 023 into the Zero position which starts the transmission time base 021 by opening the gate 022.

The purpose of the transmission of the combinations of the characteristic sequence is to bring the correspondent automatically into the data transmitting position. The reception of this sequence over the return channel indicates that the correspondent is in the desired position and can logically be used to start the actual data transmission at the station itself.

It is during the transfer of the combinations of the characteristic sequence over the outgoing and return channels that the bringing into service or disconnection of a device for increasing the propagation time is decided. The process is explained later.

The transmission of the combinations of the characteristic sequence gives rise to the following operations:

1st cycle:

The pulse leaving the terminal 0211 of the transmission time base 021 restores the transmission store 051 to the initial position;

The pulse leaving the terminal 0212 marks the characteristic combination in the transmission store 051 through the gate 057;

The pulse produced at the moment 120 ms. by the telegraph time base 03 and transmitted over the wire 209 enables the counter 075 to count a first characteristic sequence;

2nd cycle: identical with the first;

3rd cycle: identical with the first;

4th cycle: the pulse leaving the terminal 0211 restores the transmission store 051 to Zero (without change);

The pulse leaving the terminal 0212 marks the characteristic combination in the transmission store 051 through the gate 057 (without change);

The counter 075 counts the fourth pulse produced at the moment 120 ms. in the transmission cycle; this counter then delivers a pulse to the monostable multivibrator 072 which comes temporarily into the unstable Zero position and blocks the transmission time base 021 by changing over the flip-flop 023 and closing the gate 022.

After a relatively short delay, the flip-flop 072 returns to the stable One position, and re-starts the transmission time base 021, sending a pulse to the flip-flop 023 through the open gate 076. A second characteristic sequence is transmitted.

The first has served to bring the correspondent into the data transmission position. The second is sent back by it to the transmitting station where it causes the following operations:

1st cycle: the reception of the start element causes the flip-flop 122 of the reception time base 12 to change over into the Zero position and, by opening the gate 123 permits the starting of the reception time base 121. Ten milliseconds after the arrival of the start element, the flip-flop 152, brought into the One position by 121, opens the gate 153 and so permits the filling of the data receiver 151 with the elements arriving in series over the return channel 253.

One hundred and twenty milliseconds after the arrival of the start element, the characteristic sequence detector 13 counts the first characteristic combinaion received.

One hundred and forty milliseconds after the arrival of the start element, the flip-flop 152 is restored to the Zero position by 151 which permits the closing of the gate 153.

At the end of the receiving cycle, the flip-flop 122 is restored to the One position by the auxiliary time base itself, the gate 123 is closed and the reception time base stops;

2nd cycle: identical with the 1st cycle but the characteristic sequence detector 13 counts the second characteristic combination;

3rd cycle: identical with the first two cycles but the characteristic sequence detector 13 counts the third characteristic combination;

4th cycle: identical with the previous ones, but one hundred and twenty milliseconds after the arrival of the start element of the fourth characteristic combination received, since the characteristic sequence detector 13 has counted four combinations, a pulse is transmitted over the wire 208 to the flip-flop 073 which changes over into the One position and closes the gate 077 of the unit 07.

A third characteristic sequence is then in the course of being transmitted and will be received as before. At the end of the counting of the combinations in this sequence, that is to say at the moment 120 ms. in the fourth transmission cycle, the flip-flop 072 is brought into the unstable Zero position and causes the stopping of the transmission time base.

Returning to the stable One position, the flip-flop 072 cannot start the transmission because the gate 076 is closed, but the pulse which it produces passes through 077, causes 074 to change over into the One position thus opening the gate 078.

Whereas an extension of the stop element appears on the transmission line 252, characteristic combinations are still arriving over the reception line 253.

Following the last of the characteristic sequences, the transmitting device in turn receives, over the receiving channel 253, the prolonged stop element transmitted over the transmission channel 252.

The prolonged stop element detector 14 detects it after it has been permanently present for one hundred and thirty milliseconds and then transmits over the wire 203 a pulse which:

Starts the transmission time base by changing over 023 into the Zero position which opens the gate 022;

Brings 071 into the Zero position (data transmission) through the gate 078 previously opened by the flip-flop 074 conducting on the right.

The flip-flop 071 then permits, through the wire 207, as has been seen:

The advance of the tape reading device 06 by opening the gate 024;

The possible control of the device for increasing the propagation time 162 by opening the gate 167;

The control of the comparator 111 by opening the gate 112.

Moreover, the flip-flop 071 causes 091 to change over which, in the One position, opens the gate 093, permitting the setting of the switch 082.

Finally, the flip-flop 071 maintains the state of 052 which is conducting on the right in the normal transmitting position (gate 055 open).

The flip-flop 071 prohibits:

The operation of the counter 075 by closing the gate 079;

The introduction of the characteristic combinations into the transmission store 051 by closing the gate 057;

According to the state of 161, the direct transfer of the successive states of the flip-flop 1621 to the flip-flop 1625 by closing the gates 168 and 169.

The data transmission operation now being started, a distinction is made between two cases:

(1) Working without an error detected:

(a) Transmission:

The transmission time base having been started by the flip-flop 023 conducting on the left:

The pulse delivered at the terminal 0211 by the time base 021 restores the transmission store 051 to Zero and causes the switch 082 to move on by one step (wire 214) leaving its position of rest and opening the gate 0841 for access to the store stage 0811;

The pulse leaving the terminal 0212 controls the transfer of the combination read by the device 06 to the transmission store 051;

The pulse leaving the terminal 0214 controls the transfer of the combination contained in the transmission store 051 to the store 0811 by opening gate 0846;

The pulse leaving the terminal 0215 controls the advance of the reading device 06 by opening gate 024.

These pulses, which are very short, are spread out over a very short time and appear at the beginning of the starting element. By means of the transmission matrix 04, the telegraph time base 03 creates square-wave pulses which permit the line transmission of the combination contained in the transmission store 051, in accordance with a known process.

This sequence of operations is identical in each cycle, the switch 083 stepping on like the switch 082.

(b) Reception:

The arrival of the first start element causes 122 to change over and, becoming conducting on the left, this starts the auxiliary time base 121. Ten milliseconds after the arrival of this start element, 152 changes over into the One position and permits the filling of the data receiver 151. One hundred and twenty milliseconds after the arrival of the start element, a pulse is transmitted (wire 215) by the data receiver 151 to the comparator 111 through the open gates 112 and 113 and to the monostable multivibrator 092 which, returning to the stable position at the end of its time constant, causes 091 to change over. The gate 093 is then closed and the counter 082 being not stepped on any more fixes the level of the stage in the store 081 to which the combinations contained in the transmission store 051 will henceforward be transferred.

The return of the flip-flop 092 to the normal position controls the downward transfer in the central store 081 through the gate 104 and the gates opened by the switch 083.

The combination stored in each store is then transferred into the store immediately lower.

One hundred and forty milliseconds after the arrival of the start element, the return of 152 to the Zero position closes the gate 153 and prohibits the operation of data receiver 151 at the same time as this receiver is restored to Zero.

At the end of the receiving cycle, 122 changes over, becomes conducting on the right and stops the time base 121.

These functions take place in an identical manner each cycle.

(2) Working when an error has been detected.

Three cases are considered in succession:

(a) Detection of the error. One hundred and twenty milliseconds after the arrival of the start element, the comparator 111 delivers a pulse if the combination contained in the data receiver 151 is not identical with that which is contained in the store 0811.

This pulse is applied to flip-flop 101, via wire 208, and causes it to change over into the One position which opens the gate 105 and results in:

The control of the downward transfer of the central store 081 (wire 213) as a result of the pulse leaving the terminal 0213 (wire 218) from the transmission time base 021;

The control of the flip-flop 103 through the opening of the gate 109.

At the same time, the changing over of 101 causes the change of state of the flip-flop 052 (wire 202) which becomes conducting on the left and opens the gate 053 thus preparing for the retransmission of the combinations stored in the central store 081 (while the gates 055 and 057 are closed).

Finally, the flip-flop 101 which becomes conducting on the right, causes the flip-flop 023 to change over (wire 202) which stops the transmission time base 021 thus causing the line transmission of a prolonged stop element, said prolongation in itself constituting an indication of an error.

It should be noted that the flip-flop 101 prohibits:

The operation of the comparator 111 by closing the gate 113;

The advance of the reading device 06 by closing the gate 025 (wire 201);

The control, by the reception, of the downward transfer in the central store 081 (the gate 104 being closed cannot transmit the pulse produced by the data receiver 151 one hundred and twenty milliseconds after the arrival of the start element and retransmitted by 092).

(b) Retransmission from the erroneous combination on. The prolonged stop element which indicates the error returns from the receiving station over the receiving channel and starts the retransmission in the following manner:

The prolonged stop element is detected by the detector 14 which, one hundred and thirty milliseconds after having detected the beginning of this prolonged element on the receiving channel, transmits a pulse:

To the flip-flop 023 (wire 203) which, in the Zero position, then permits the starting of the transmission time base 021;

Through the gate 109 to the flip-flop 103 which changes over into the Zero position in which position it opens the gate 108.

The time base having been started, a first retransmission cycle is effected in the course of which:

The pulse leaving terminal 0211 and delivered by the device 021 restores the transmission store 051 to Zero;

The pulse leaving the terminal 0212 transfers the combination contained in the store 0811 to the transmission store 051 through the gates 054 and 053 (the transfer is carried out in parallel and there are five gates 054 and five gates 053);

The pulse leaving the terminal 0213 controls the transfer of each combination stored in a given store to the store of immediately lower rank by opening the gates 0851 to 0854;

The pulse leaving the terminal 0214 controls the transfer of the combination contained in the transmission store 051 to the store 081 at the level opened by the switch 082;

The pulses leaving the terminals 0215 and 0216 have no effect.

The course of these operations is identical for each retransmission cycle up to the reception of the first combination retransmitted after the prolonged stop element indicating the error.

(c) End of retransmission—return to normal data transmission.

As soon as the first combination which has been retransmitted appears over the receiving channel, the first start element causes 122 to change over which starts in the auxiliary time base 121. Moreover, the leading edge of the start element causes 102 to change over (wire 204) which, in the Zero position, opens the gates 106 and 107, preparing for the end of the retransmission. Ten milliseconds after the arrival of the start element, as a result of a pulse leaving 121, the flip-flop 152, in the One position, permits the filling of the data receiver 151. Through a pulse delivered by 151 to 106 (wire 206), one hundred and ten milliseconds after the arrival of the start element, or through the pulse leaving the terminal 0216 (wire 205) for 107 on the transmission of the last combination to be retransmitted (the first of these pulses is effective alone), the flip-flop 101 comes into the Zero position thus characterizing the end of the retransmission, the element 052 comes into the One position, closes the gate 053 and opens the gate 055. The advance of the tape reader 06 is now permitted since the gate 025 is open through the wire 201.

Similarly, the operation of the comparator is again possible as a result of the opening of the gate 113. Finally, the pulse delivered by the data receiver 151, one hundred and twenty milliseconds after the arrival of the start element and relayed by the monostable multivibrator 092 henceforward controls the downward transfer in the central store through the gate 104.

One hundred and twenty milliseconds after the appearance of the start element, the comparison again takes place in the comparator 111 between the combination contained in the element 0811 and that recorded in the data receiver 151 which, as a result of the chain of operations, is precisely that combination previously found to be erroneous.

The monostable multivibrator 092 is actuated at the same moment. Returning to the stable position it controls the downward transfer.

At the moment 140 ms. in the receiving cycle, the restoration of the flip-flop 152 and the end of the stepping on of the data receiver 151 take place.

At the end of the receiving cycle, the restoration of the flip-flop 122 takes place which stops the auxiliary time base.

The automatic bringing into service of the device for increasing the propagation time 16 takes place exclusively when the movement 120 ms. in the reception cycle falls within the limits 140 ms. to 20 ms. in the transmission cycle, this coincidence being tested immediately after the establishment of the connection through the characteristic sequences, the additional propagation only coming into action after the extension of the stop element.

The gate 164 is opened between the moments 140 ms. and 20 ms. in each transmission cycle through a square-wave pulse leaving the telegraph time base 03.

The gate 165 is only opened by the flip-flop 073 in the Zero position through the wire 216. It is therefore closed when the flip-flop 073 is brought into the One position by the pulse originating from the characteristic sequence detector 13 and transmitted through the wire 208. At the moment 120 ms. in the receiving cycle, the flip-flop 161 cannot change its state unless there is coincidence between this moment and the interval 140 ms. to 20 ms. in the transmission cycle.

If there is coincidence, the gate 166 is opened. But the characteristic combinations are still transferred to the transmission channel without delay because the gates 168 and 169 are opened through the wire 217 by the flip-flop 071 during the operation of changing over into the One position (transmission of the characteristic sequence).

After the prolonged stop element following the last characteristic sequence, the gate 167 is opened whereas the gates 168 and 169 are closed by the changeover of the flip-flop 071 to the data transmitting state. The device for increasing the propagation time is here represented by a shift store 162 the stepping on of which is controlled by the multivibrator 163 synchronized by the time base 03 through the open gates 166 and 167.

The delay introduced by this shift store has been selected in such a manner as to be certain to avoid the disadvantages which it is proposed to overcome.

The operation of the receiving section (FIG. 2) is as follows:

The closing of a "start-stop" key M causes:

In the unit 34:

The bringing of the flip-flop 342 into the One position which then prohibits the marking of the store 341 by closing the gate 343.

In the unit 35:

The bringing into the One position of the flip-flop 351 which, becoming conducting on the right, opens the gate 385 thus preparing for the stepping on of the switches 382 and 383 (the switch 383 is controlled by the switch 382 through an inter-stage connection). The flip-flop 351 in the Zero condition prohibits:

The access to the central store 381 through the closing of the gate 363 and consequently of the gates 3846 (there are five of them);

The downward transfer in said store 381 through closing of the gate 366 (wire 401);

The control of the restoration of the flip-flop 361 through closing of the gate 367;

The restoring to Zero of the switch 382 through closing of the gate 384.

The closing of the key M also leads to:

The bringing into the Zero position of the flip-flop 353 which blocks the gate 357 and prohibits the counting of the characteristic sequences by the flip-flop 356;

The bringing into the Zero position of the flip-flop 354 which prohibits the restoration of the flip-flop 351 through closing of the gate 352;

The bringing into the Zero position of the flip-flop 356 which constitutes the characteristic sequence counter. It will be noted that this bringing into the Zero position of 356 does not start the monostable multivibrator 355 which is likewise held by the potential given by the key M.

In the unit 36:

The bringing into the Zero position of the flip-flop 361 which, becoming conducting on the left, opens the gate 365 to permit the control of the stepping on of the switch 383.

For propagation times which may vary from twenty to six hundred and twenty milliseconds (which incidentally justifies the five stages of the central store 081), the transmitting station transmits three characteristic sequences over the line.

The detection, by the detector 41 of the receiving device, of the first characteristic sequence, starts the changeover into the data transmitting position, at the receiving end.

This first sequence is therefore not sent back to the transmitting station. Only the second and third sequences are sent back.

The reception of these various sequences is followed by the following operations:

On the first receiving cycle, the start element of the first characteristic combination received causes the flip-flop 372 to changeover into the Zero position which, by opening the gate 373, starts the auxiliary time base 371.

Ten milliseconds after the arrival of the start element, this causes the flip-flop 392 to changeover into the One position through the wire 408, which opens the gate 393, permitting the stepping on of the data receiver 391. One hundred and twenty milliseconds after the arrival of the start element, the sequence detector 41 counts a characteristic combination. One hundred and forty milliseconds after the arrival of the start element, the flip-flop 392 changes over to Zero, becomes conducting on the left, and closes the gate 393 which has the effect of prohibiting the stepping on of the data receiver 391 which is restored to the initial position.

At the end of the receiving cycle, the flip-flop 372 comes into the One position under the influence of a pulse leaving the auxiliary time base 371 and stops the latter.

The second and third receiving cycles for the characteristic combinations are identical.

At the fourth cycle, one hundred and twenty milliseconds after the arrival of the start element, the detector 41, having counted four consecutive combinations, delivers a pulse to the flip-flop 353, via wire 409, and brings it into the One position which has the effect of opening, via wire 403, the gates 357 and 394. This double opening permits, on the one hand the counting of the characteristic sequences by the counter 356 and on the other hand the retransmission of the characteristic combinations over the transmission channel 253.

The first, second and third receiving cycles of the second characteristic sequence are identical to the receiving cycles of the same order for the first characteristic sequence. One hundred and twenty milliseconds after the arrival of the start element of the fourth characteristic combination in the second sequence, the characteristic sequence detector 41 transmits a pulse to the flip-flop 356 which, changing over, counts a first characteristic sequence. The first, second and third receiving cycles of the third characteristic sequence are identical with the receiving cycles of the same order for the first characteristic sequence. One hundred and twenty milliseconds after the arrival of the start element of the fourth characteristic combination in the third sequence, the characteristic sequence detector 41 transmits a pulse to the flip-flop 356 which, by changing over, counts a second characteristic sequence and controls the changing over into the Zero position of the monostable multivibrator 355. This automatically starts the time base 321 by bringing, via wire 404, the flip-flop 323 into the Zero position which opens the gate 322. Returning to rest, the flip-flop 355 brings the flip-flop 354 into the One position which opens the gate 352 thus preparing the control of the flip-flop 351 through the wire 402 and restores the switches 382 and 383 to the initial position.

The prolonged stop element follows the last character of the third characteristic sequence.

An essential problem to be solved consists in determining the number of characters to be stored at the receiving end. This number should be the same as at the transmitting end. The selection should be automatic and the use of a characteristic indication to obtain this result cannot be accepted. This result is obtained by using the indication constituted by the extension of the stop element, the duration of which is automatically a function of the propagation time. For this purpose, the number of complete cycles of one hundred and fifty milliseconds contained in the prolonged stop element which follows the last transmission of a characteristic sequence are counted. This quotient is used to determine the number of stages of the central store 381 allowed to become operative.

In order to obtain this result, the stepping on of the switches 382 and 383 is controlled by the time base 32, started one hundred and twenty milliseconds after the arrival of the start element of the last combination in the last characteristic sequence received. This stepping on will be stopped ten milliseconds after the arrival of the start element of the first combination received after the prolonged stop element, by bringing the flip-flop 351 into the Zero position, which closes the gate 385, while at the same time the counter 382 is restored to the initial position. The number of stores brought into action is defined, and remains so, by the switch 383 which has stepped on like the switch 382 but which is not, itself, restored to the initial position.

The operation preparatory to the data transmission position is then followed by the actual data transmission operation.

The start element of the first combination appearing over the receiving channel 252 after the prolonged stop element, starts the auxiliary time base 37 by bringing the flip-flop 372 into the Zero position which opens the gate 373 ten milliseconds after on a pulse transmitted by 408, the flip-flop 392 changes over and controls the stepping on of the data receiver 391 by opening the gate 393.

A pulse is transmitted, by the data receiver 391, to the flip-flop 351, through the wire 402 and the gate 352. The flip-flop 351, brought into the Zero position, controls:

The stopping of the time base 32 by bringing the flip-flop 323 into the One position which closes the gate 322;

The filling of the reception store 341 by bringing the flip-flop 342 into the Zero position, which opens the gate 343, for the incoming combinations;

The bringing of the flip-flop 361 into the One position, which opens the gate 364 controlling the stepping on of the switch 382;

The restoration of the switch 382 to the initial position (wire 401).

In this same Zero position, the flip-flop 351 permits:

The control of the downward transfer in the store 381 through the opening of the gate 366;

The control of the transfer from store 341 to the central store 381 through the opening of the gate 363;

The control of the restoration of the flip-flop 361 through the opening of the gate 367;

The restoration of the switch 382 to the initial position by means of a pulse leaving the prolonged stop element detector 40 through the gate 384.

In the Zero position, the flip-flop 051 prohibits:

The control of the stepping on of the switches 382 and 383 by the time base 32 through the closing of the gate 385.

As the combinations appear over the receiving channel 252, they are temporarily stored in the data receiver 391 while at the same time, after regeneration, they are transferred to the circuit 33 which feeds the return channel 253 to the transmitting station, through the gate 394.

One hundred and ten milliseconds after the arrival of the start element of the combination, the switch 382 is stepped on by one step, leaving its initial position, while the store 341 is reset (wire 405).

One hundred and twenty milliseconds after the arrival of the start element, the store 341 is filled by the contents of the data receiver 391 and the monostable multivibrator 362 changes over into the unstable One position. Returning to the stable Zero position, it controls the transfer of the combination stored in the reception store 341 to the stage of the central store 381 selected by the switch 382.

One hundred and forty milliseconds after the arrival of the start element, the flip-flop 392, restored to the Zero position and closing the gate circuit 393, prohibits the stepping on of the data receiver 391, while at the same time it restores it to the initial position.

At the end of the receiving cycle, the restoration of the flip-flop 372 stops the operation of the auxiliary time base 371.

Each receiving cycle is identical with this; the counter 382 stepped on by one step at the moments one hundred and ten milliseconds in each receiving cycle, permits the combinations received to be recorded in each store which it opens in succession.

When it reaches the level defined on the reception of the prolonged stop element and specified by the switch 383, a pulse is transmitted through whichever of the gates 3871 to 3873 is open, to the flip-flop 361. This pulse is produced by the flip-flop 362 returning to the Zero position after having been changed over into the One position one hundred and twenty milliseconds after the arrival of the start element, by 391. The flip-flop 361, coming into the Zero position, closes the gate 364 thus prohibiting any stepping on of the switch 382. By opening the gate 365 it controls the downward transfer in the central store 381 by the pulse delivered at the moment ten milliseconds in the receiving cycle and produced by the data receiver 391 (wire 402).

At the same time, this pulse controls the transfer of the combination contained in the store 3811 to an output recorder, for example a punch.

In the event of an error indicated by the transmitting station, the operation is as follows:

Ten milliseconds after the arrival of the prolonged stop element, the prolonged stop element detector analyses the state of the channel. If, instead of finding a start element, it detects a prolonged stop element, the detector 40 emits a pulse which restores the switch 382 to the initial position and causes 361 to change over into the One position while at the same time the prolonged stop element is retransmitted over the transmission channel.

The changing over of 361 closes the gate 365 thus prohibiting any downard transfer while at the same time the gate 364 is opened for the control of the stepping on of the counter 382.

The start element of the first combination received after the prolonged stop element indicating the error starts the auxiliary time base 37 and ten milliseconds after the arrival of this start element, the data receiver 391 is stepped on.

At the moment one hundred and ten milliseconds in the receiving cycle, a pulse for the restoration to the initial position is transmitted to the store 341 while at the same time the switch 382 leaves its initial position and is shaped on by one step.

At the moment one hundred and twenty milliseconds in the receiving cycle, the combination contained in the data receiver 391 is transferred to store 341 through 344 and 343.

Shortly afterwards, then the monostable multivibrator 362 returns to the Zero position after having been operated one hundred and twenty milliseconds after the arrival of the start element, the combination stored in 341 is transferred to the store 3811, thus taking the place of the combination previously recorded before the prolonged stop element indicating an error. Thus, in the following cycles, the switch 382, by being stepped on by one step in each cycle, permits the transfer of the combinations contained in the element 341 to the central store which has the effect of eliminating the combinations marked before the error signal.

When the switch 382 arrives at the level defined at the time of the reception of the prolonged stop element and specified by the switch 383, the flip-flop 361 closes the gate 364, thus prohibiting any stepping on of the counter 382.

During the same time, through the opening of the gate 365, the downward transfer is controlled at every 10 ms. moment in the receiving cycles.

What I claim is:

1. A transmission system including a transmitting station and a receiving station selected from a plurality of receiving stations connected to said transmitting station through duplex switchable communication channels, the transmitting station comprising means for transmitting data representative signals and check-back comparison means of said signals, retransmitted from said receiving station, the receiving station comprising means for receiving and transmitting back said signals to the transmitting station, in each of said transmitting and receiving stations a central store with a plurality of stages adapted to store individually a plurality of successive signals, access means for introducing said signals at any desired stage from said transmitting means, transfer means for transferring simultaneously the signals contained in stages of given ranks to the respective stages of immediately lower ranks and to the transmitting means, means for determining the time of propagation of the signals from the transmitting station to the receiving station and back from the receiving station to the transmitting station, and control means operative to control said access means and said transfer means in order to limit the number of stages used in said central stores to the number of signals transmitted during said propagation time.

2. A transmission system including a transmitting station and a receiving station selected from a plurality of receiving stations connected to said transmitting station through duplex switchable communication channels, the transmitting station comprising means for transmitting data representative signals and check-back comparison means of said signals retransmitted from said receiving station, the receiving station comprising means for receiving and retransmitting said signals to the transmitting station, in each of said transmitting and receiving stations a central store with a plurality of stages adapted to store individually a plurality of successive signals, a stepping switch for access to said stages permitting each signal to be introduced at any desired stage, a downward transfer control circuit enabling the signals contained in stages of given ranks to be transferred simultaneously to respectively the stages of immediately lower ranks and to the transmitting means, means for determining the time of propagation of the signals from the transmitting station to the receiving station and back from the receiving station to the transmitting station, and control means responsive to said propagation time for selectively controlling said stepping switch and said downward transfer control circuit to limit the number of stages used in said central stores to the number of signals transmitted during said propagation time.

3. A transmission system according to claim 2 in which, at said transmitting station, means for selectively controlling the stepping switch comprises first means for gating a sequence of successive signals to the transmitting means, second means for gating said signal sequence to the stages of successively rising rank of said central store from the first stage thereof, means responsive to the reception of the first signal of said sequence for stopping said second gating means, whereby, from the stopping instant, all the signals transmitted are gated to the same permanent stage, and the means for selectively controlling the said downward transfer control circuit comprises means, responsive to said back comparison means, for gating the signals stored in the first and following stages up to said same permanent stage to the transmitting means.

4. A transmission system according to claim 2 in which said transmitting station comprises means for transmitting prolonged stop signals and error signals, said stop signals having a duration equal to said propagation time, and in which said receiving station comprises means for receiving said stop signals and said error signals, and comparing means for determining the number of the data representing pulse signals received for the duration of a prolonged stop pulse signal or in the duration of the error signal derived from said stop signal, deriving therefrom the number of stages of the central store to be used at said receiving station and fixing the rank of the last stage to be brought into operation, the means for selectively controlling the stepping switch comprising first means for gating a sequence of successive signals to the receiving means, and second means for gating said signal sequence to the stages of successively rising rank of said central store from the first stage thereof, means responsive to the end of said prolonged stop signal for stopping said second gating means, whereby, from the stopping instant, all the signals received are gated to the same permanent stage, and the means for selectively controlling said downward transfer control circuit comprises means, responsive to said error signal, for gating the signal stored in the first and following stages up to said same permanent stage to the retransmitting means.

References Cited

UNITED STATES PATENTS 3,228,000 1/1966 Collis ------------ 340—146.1

MALCOLM A. MORRISON, *Primary Examiner.*

K. F. MILDE, *Assistant Examiner.*